INVENTORS
Howard R. Dohring, &
BY Philip K. Trimble
Warren D. Hill
ATTORNEY

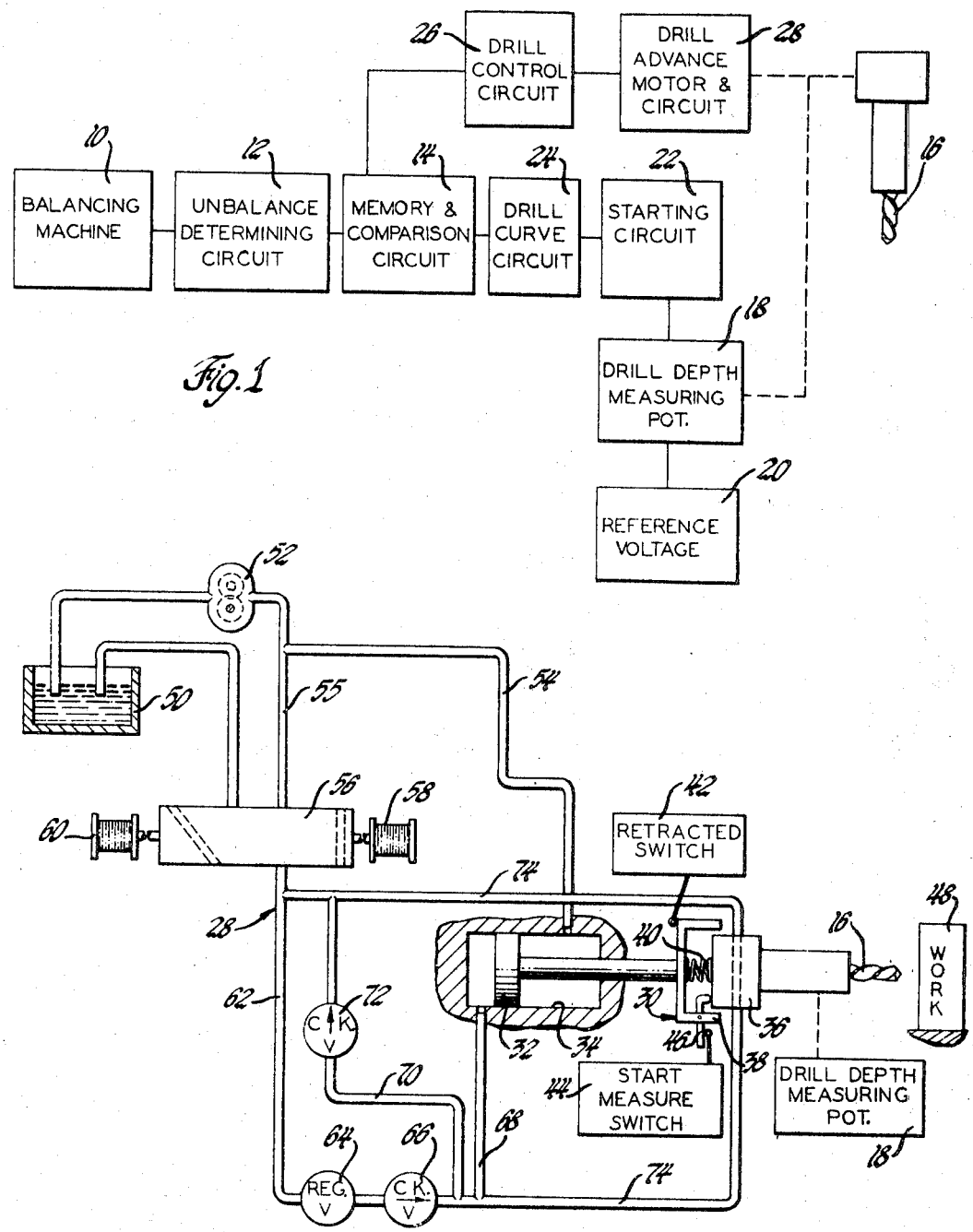

United States Patent Office
3,487,730
Patented Jan. 6, 1970

3,487,730
MACHINE TOOL FEED CONTROL
Howard R. Dohring, Southfield, and Philip K. Trimble, Rochester, Mich., assignors to General Motors Corporation, Detroit, Mich., a corporation of Delaware
Filed Dec. 12, 1966, Ser. No. 600,805
Int. Cl. B23b 39/10, 47/18
U.S. Cl. 77—32.1
8 Claims

ABSTRACT OF THE DISCLOSURE

An automatic drilling machine has a slip spindle which allows axial movement between the tool holder and a housing upon contact of the drill with the workpiece. The slip spindle movement actuates a switch in an electronic drill depth measuring circuit and the movement also actuates a hydraulic device to reduce the rate of drill feed.

---

This invention relates to feed controls for machine tools, and more particularly to means for controlling the rate of feed and depth of cut of machine tools.

This description is directed specifically to controls for unbalance correction drills in automatic balancing machines, although the invention is equally applicable to other machine tools which utilize controls for regulating the rate of feed and depth of cut. In conjunction with automatic balancing machines, there is usually provided an unbalance correction drill which removes material from the part being balanced according to instruction from the balancing machine. The depth of drilling must be closely controlled in order to achieve accurate balancing. In addition, it is common procedure in order to save drilling time, to advance the drill toward the workpiece at a rapid feed rate and as the drill closely approaches the workpiece surface, to reduce the feed rate to a proper cutting speed. For optimum performance, both functions, i.e., controlling drilling depth and drilling feed rate, must be relayed in time to the instant that the drill contacts the workpiece surface. In the past, however, this has not been accomplished. Usually, dogs or cams mounted on the machine are used to trip switches or shift valves according to a predetermined advanced position of the drill. The dogs are set at a position corresponding to a fictitious reference surface just short of the approximate location of the workpiece surface. This arrangement leads to inaccuracies in drilling depth and lost time in drill advance since workpieces, particularly castings and forgings, have dimensional variations and accordingly, the actual workpiece surface will not always be coincident with the predicted location of such surfaces. Moreover, it is an occasional occurrence that the drill will enter the same hole two or three times until it removes the correct amount of material. For the second and third such entrances, a new workpiece surface, i.e., the bottom of the hole, is presented to the drill, but the drill, having been set up for operating on uncorrected parts, will change from rapid feed to slow feed and will start measuring depth of the cut at the same predicted location of the workpiece surface, thereby wasting a great deal of time due to the slow feed rate through the previously drilled hole and in addition, will tend to inaccurately measure the depth of additional drilling because measurement is again made from the fictitious inaccurate reference surface.

It has been proposed to singly control either the feed rate or the drill depth measurement by reference to the actual workpiece surface, for example, by using a slip spindle in the drill head so that as the drill contacts the work surface, the spindle will be axially shifted within the drill head, the relative motion between the spindle and the drill head being used to trip a switch which starts drill depth measurement or to shift a feed rate control valve. In this manner, one of the two problems just mentioned is overcome but the other problem remains. Heretofore, no means has been devised to overcome both problems in a machine tool even though both problems exist simultaneously especially in the area of balancing machine correction drills.

It is a general object of this invention to provide an improved cutting tool control.

It is another object of the invention to control the depth of cut of a machine tool and the rate of feed of the machine tool based upon the point of contact of the cutting tool with the workpiece.

It is a further object of the invention to control the feed rate and penetration of a drill with respect to the actual workpiece surface.

The invention is carried out by sensing the point of contact of a cutting tool with a workpiece, generating a signal coincident with the point of contact and providing means responsive to the signal for changing the feed rate and for starting measurement of cutting depth.

The invention is further carried out with respect to a drilling machine by providing means to sense the point of contact of the drill with the workpiece by providing means to effect relative movement between the drill spindle and a housing supporting the spindle upon the point of contact and by providing means responsive to the relative movement for controlling the feed rate and drill depth. Preferably, the means for controlling the feed rate is a hydraulic valve in a hydraulic feed control circuit which valve is shifted by the movement between the spindle and its housing and the means for controlling the drill depth is an electrical switch in a depth measuring circuit.

The above and other advantages of the invention will become more apparent from the following description taken in conjunction with the accompanying drawings wherein like reference numerals refer to like parts and wherein:

FIGURE 1 is a block diagram of a balancing machine correction drill control circuit;

FIGURE 2 is a schematic hydraulic circuit for a drill feed mechanism according to the invention;

Figure 3:
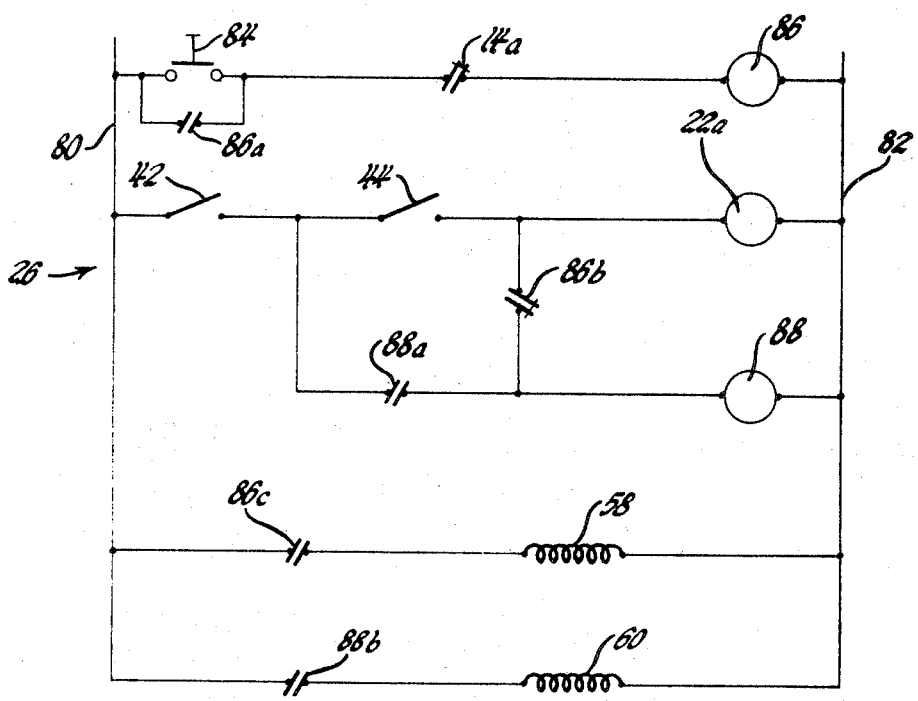
FIGURE 3 is a schematic electrical circuit for controlling the hydraulic circuit of FIGURE 2.

The block diagram of FIGURE 1 represents a control means for an unbalance correction drill associated with a balancing machine and is more fully described in the United States patent number to Trimble 3,228,264. In general, FIGURE 1 represents a balancing machine 10 having an unbalance determining circuit 12 which feeds to a memory and comparison circuit 14, a voltage representative of the amount of unbalance to be removed from the workpiece. The depth of penetration of the drill 16 is measured by a drill depth measure potentiometer 18 having a sliding contact, not shown, mechanically connected to the drill 16 for movement therewith. A reference voltage 20 is supplied to the potentiometer. A signal generated at the point at which depth measurement begins, i.e., the instant of contact of the drill with the workpiece, is fed into the control by the starting circuit 22. Thus, the combination of the starting circuit 22 and the drill depth measuring potentiometer produces an output voltage indicative of the drill depth and this signal is fed the control curve circuit 24 which translates the drill depth to a further signal which is indicative of the amount of unbalance removed by the drill. This latter output is fed to the memory and comparison circuit 14, which compares the amount of unbalance removed with the original amount of unbalance and when the two values are equal, feeds a signal to the drill control circuit 26 which in turn controls a drill advance motor and circuit 28 to stop further drilling and to retract the drill from the workpiece.

FIGURE 2 illustrates a hydraulic mechanism comprising the drill advance motor and circuit 28 for effecting the feed of the drill 16 and includes some associated electrical switches. A drill 16 is supported by a slip spindle assembly 30 which is axially movable by a hydraulic motor having piston 32 and cylinder 34. The slip spindle arrangement 30 is described in detail hereinafter, but generally includes a deceleration valve portion 36 longitudinally shiftable within a housing 38 which valve portion is biased forwardly by a spring 40. A retracted switch 42 is mechanically operated by the movement of the housing 38 so that the switch is open only when the drill head is in its completely retracted position as shown in the drawing. A start measure switch 44, which is a portion of the starting circuit 22, is operated upon relative movement of the valve 36 in the housing 38 by means of a lever 46 pivoted on the housing 38. Means not shown are provided to rotate the drill 16. This latter means is described further in connection with FIGURE 4. The slip spindle arrangement 30 is so designed that when the drill 16 is moved into contact with the workpiece 48 by the piston 32, the reaction of the workpiece against the drill will cause the drill and associated valve 36 to compress the biasing spring 40 as the piston 32 and the housing 38 advance thereby effecting relative movement between the valve 36 and the housing 38. The hydraulic lines shown are stationary relative to the housing 38 so that the movement of the valve 36 with respect to the housing 38 effects closing the hydraulic lines.

The hydraulic system includes in addition to the valve 36 and the hydraulic motor, a reservoir 50, a pump 52 having a line 54 leading to the retract end of cylinder 34 and has a further line 55 extending to solenoid valve 56 which is operated by an advance solenoid 58 and a retract solenoid 60. Extending from the lower side of the valve 56 as shown in FIGURE 2, line 62 extends through a pressure regulating valve 64 and check valve 66 to line 68 which is connected to the advance end of cylinder 34. A return line 70 connects line 68 through a check valve 72 to the solenoid valve 56. A further line 74 extends from the valve 56 through the valve 36 to the line 68.

In operation, when neither of the solenoids 58 and 60 are energized and the solenoid valve 56 is in neutral position as shown, hydraulic pressure is supplied by the pump 52 through line 54 to the retract side of the cylinder 34 to maintain the piston 32 in the retracted position as shown. When, however, the solenoid 58 is energized to shift the valve 56 to the left, line 55 will be connected through the valve 56 to line 74 and the pressure will be transmitted through valve 36 and line 68 to the advance end of cylinder 34 so that the piston 32 and the drill 16 will be rapidly advanced toward the workpiece 48. However, when the drill 16 contacts the workpiece, the valve 36 will be shifted to the left relative to line 74 to close line 74. Hydraulic fluid will still be supplied through line 62 and 68 to the cylinder but at a slow rate due to the action of the pressure regulating valve 64 so that the drill 16 will penetrate the workpiece at a slow cutting speed. Further, upon contact of the drill 16 with the workpiece, the shifting of valve 36 relative to housing 38 will cause closing of the start measure switch 44 which actuates the starting circuit 22. The drill depth measurement potentiometer 18 then senses the advance of the drill through the workpiece and when a sufficient depth has been achieved as determined by the circuit of FIGURE 1, the drill control circuit 26 will deenergize the solenoid 58 to return the valve 56 to neutral position and then will energize the solenoid 60 to shift the valve 56 to the right, whereupon lines 68 and 70 will be connected to the reservoir and the pressure in line 54 will cause the drill 16 to retract. The retract switch 42 will be opened when the drill has reached its completely retracted position.

A circuit shown in FIGURE 3 comprises the drill advance motor and circuit 28 and comprises a voltage supply line 80 and a ground line 82. A manually controlled push button advance switch 84 is in series with normally closed contacts 26a which are a portion of the drill control circuit 26, and also is in series with relay coil 86. Normally open contacts 86a are in parallel with switch 84. Contacts 86a are closed upon energization of relay coil 86 to serve as holding contacts when coil 86 is energized and button 84 is released. Retracted switch 42 is in series with start measure switch 44 and start measure relay 22a which energizes the starting circuit 22. The retract switch 42 is also in series with normally open contacts 88a and retract relay 88. Normally closed contacts 86b controlled by coil 86 are connected between the hot sides of coils 22a and 88. Normally open contacts 86c are in series with the advance solenoid 58 so that the solenoid will be energized when the contacts 86c are closed and similarly, normally closed contacts 88b are in series with retract solenoid 60 so that the solenoid is energized when the contacts 88b are closed.

In operation, then, when the advance switch 84 is manually closed, relay coil 86 will be energized closing holding contacts 86a and closing contacts 86c to energize the advance solenoid 58 which causes the drill 16 to advance by means of the hydraulic mechanism of FIGURE 2. At the same time, contacts 86b will be opened. As soon as advance feed movement of the drill 16 begins, retract switch 42 closes. When the drill 16 contacts the work and valve 36 shifts in housing 38, start measure switch 44 will be closed energizing the start measure relay 22a, whereby the starting circuit 22 of FIGURE 1 will start the depth measurement. As the drill penetrates the work-piece, the drill depth measurement potentiometer will change in output voltage up to a point sufficient to satisfy the memory and comparison circuit 14, which then causes the contacts 26a to open thereby deenergizing coil 86 which effects opening of contacts 86c to deenergize solenoid 58 and at the same time, contacts 86b will close, thus completing a circuit to the retract solenoid 88 which closes contacts 88a and 88b, whereupon the retract solenoid 60 is energized and the drill is retracted until retract switch 42 is opened to deenergize coil 88 and hence deenergize solenoid 88.

Figure 4:
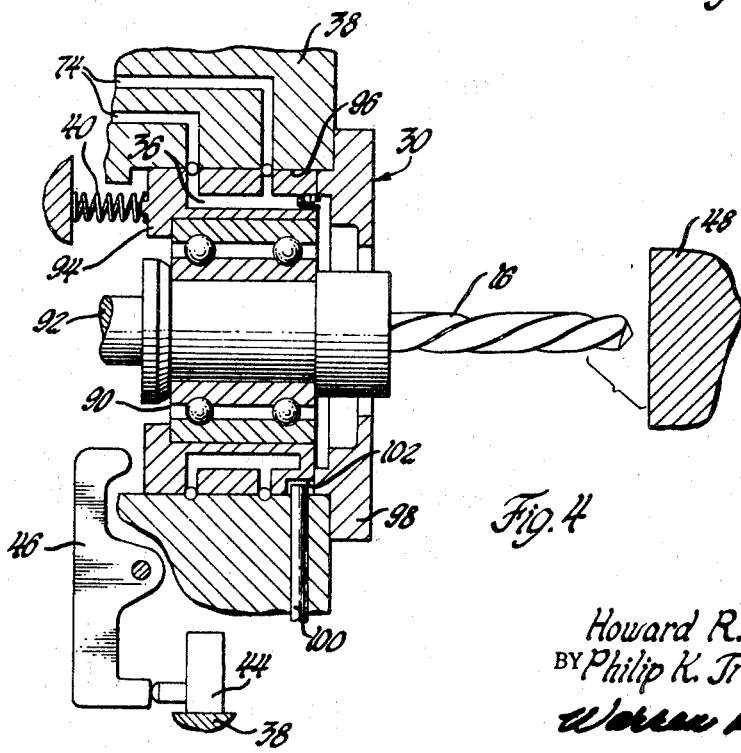
FIGURE 4 is a detailed cross-sectional view of a slip spindle arrangement of FIGURE 2 according to the invention.

FIGURE 4 illustrates in detail the slip spindle arrangement 30 which includes drill 16 mounted on a rotating shaft 92 and supported by bearings 90. The bearings 90 are mounted in a float cage 94 which in turn is slidably carried within a bore 96 in housing 38. The bore 96 is greater in depth than the float cage 94 so that axial movement of the cage within the housing is permitted. Spring 40 biases the float cage forwardly against a stop plate 98 secured by any suitable means to the housing 38. A pin 100 extending through the housing 38 engages a notch 102 in one edge of the cage 94 to prevent cage rotation. A pair of hydraulic lines 74 extend through the housing 38 and terminate at the bore 96. The bearing float cage 94 includes valve portion 36 comprising a passageway which has two termini coinciding with the two portions of hydraulic line 74 when the cage is in its forwardmost position as shown. The passageway of valve portion 36 and line 74 terminate in grooves which encircle the float cage 94 and bore 96 respectively in order to provide a large valve port area without requiring large port dimensions in the direction of the drill axis. Thus, only a small shift, say one-eighth inch, of the float cage within the housing is required to close the valve and stop fluid flow through hydraulic line 74. A lever 46 is pivotally mounted on the housing 38 having one end in interference with the float cage 94 in its rearwardmost position and having its other end contacting the start measure switch 44, which switch is mounted on the housing 38. Thus, when the drill 16 is advanced into contact with the workpiece 48, the reaction of the workpiece against the drill effects relative movement of the float cage 94 and the housing 38 as the housing continues to advance under the influence of the hydraulic motor. This motion then comprises a signal that the drill has made contact with the workpiece and the resultant shifting of the deceleration valve stops fluid flow through line 74 to reduce the rate of feed. The same signal causes actuation of the start measure switch 44 since during the last increment of rearward motion of the float cage 94 relative to the housing, the float cage contacts the end of lever 46 to move the lever about its pivot to actuate the switch 44.

Figure 5:
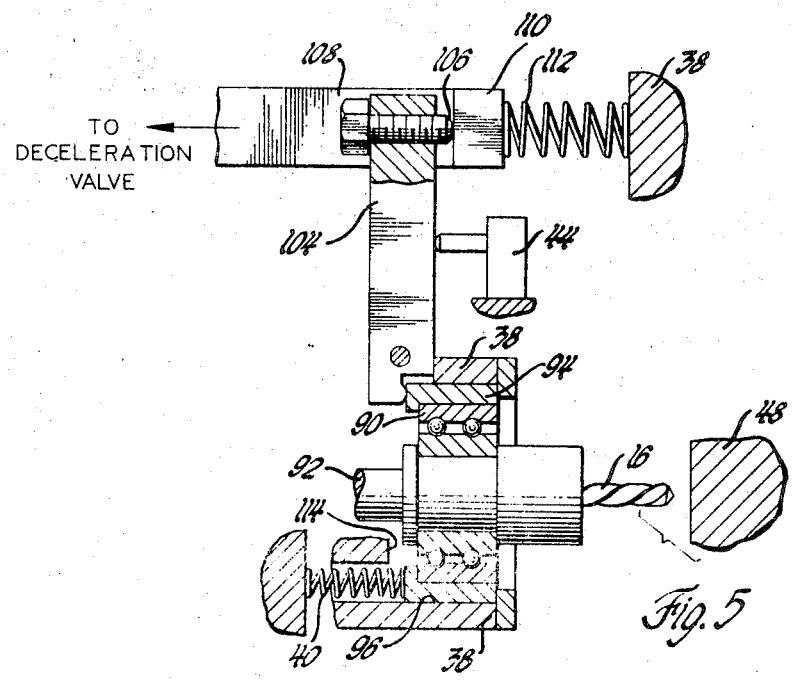
FIGURE 5 is a cross-sectional view of another embodiment of a slip spindle arrangement according to the invention.
Figure 6:
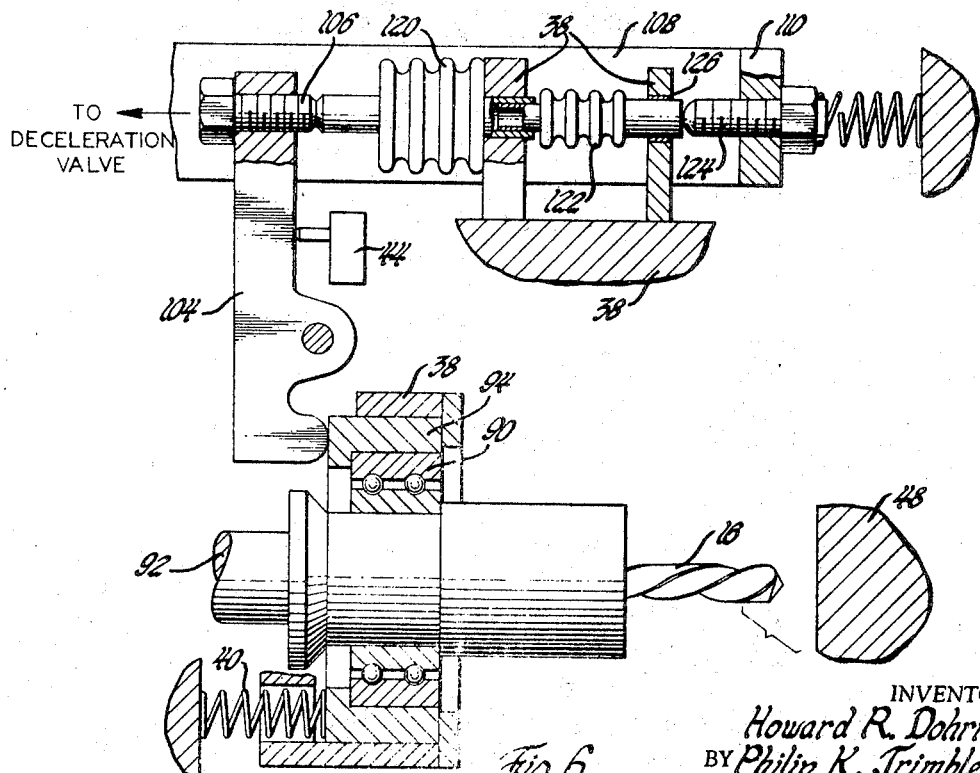
FIGURE 6 is a cross-sectional view of a further embodiment of a slip spindle arrangement according to the invention.

The deceleration valve described relative to FIGURES 2 and 4 is a specially made deceleration valve. However, many commercially available machine tools have deceleration valves which may be coupled to the slip spindle by linkages for shifting in response to a signal that the cutting tool has contacted the workpiece. Such linkages are shown in FIGURES 5 and 6. FIGURE 5 illustrates the workpiece 48 and the drill 16 mounted on bearing 90, which in turn is mounted in a bearing float cage 94 within a housing 38. As described above, relative to FIGURE 4 the float cage 94 is adapted to axially slide within the housing 38 and is biased forward by spring 40 and the entire assembly is movable by the hydraulic motor. A lever 104 pivotally mounted on the housing 38 contacts the float cage at one end and carries at the other end a threaded adjustable abutment member 106. A shiftable link 108 slidingly mounted on housing 38 by means not shown has a lug portion 110 contacting the abutment member 106 for movement therewith. Spring 112 biases the shiftable link rearwardly. Starting switch 44 contacts the lever 104 at a point intermediate the pivot point on the abutment member, while the shiftable link 108 is mechanically connected to the deceleration valve of the feed mechanism. Thus, in this embodiment when the drill contacts the work and the bearing float cage is shifted rearwardly, the lever 104 will move about its pivot to shift the link 108 and the deceleration valve as well as to actuate the start measure switch 44. Due to the mechanical amplification by the lever 104, which may conveniently be 10 to 1, a small amount of travel in the float cage is necessary depending upon the design of the deceleration valve. Typically, 0.15 inch movement of the deceleration valve is required and accordingly only 0.015 inch movement in the slip spindle is required to effect the valve shifting. In that case then it is preferable to provide 0.020 inch movement in the slip spindle so that the first 0.015 inch of travel is used to actuate the valve and the last 0.005 inch of travel is used to operate the start measure switch 44. The drill depth measurement should be begun at the end of the slip spindle travel so that the lost motion within the slip spindle will not be computed as drill penetration. In addition, the extra amount of lost motion provided after the deceleration valve has shifted provides an opportunity for the feed rate to actually become reduced before the full feed force is applied to the drill by reason of the float cage bottoming against the rear wall 114 of the bore 96.

The embodiment of FIGURE 6 is much like that of FIGURE 5 except that in addition to the mechanical amplification effect by the lever 104, a hydraulic amplification is also provided. This is carried out by providing between the adjustable abutment member 106 and the lug 110 on the shiftable link 108, a hydraulic amplification device including a pair of bellows each having an inner end secured to a portion of the housing 38. A large bellows member 120 extending between the housing portion 38 and the abutment member 106 has a solid hydraulic connection with a small diameter bellows 122, which in turn contacts the lug 110 of shiftable link 108 via a second adjustable abutment member 124. Slidable bearing 126 supported by the housing 38, supports the right end of the small bellows 122. The large bellows is compressed by the motion of lever 104 and the small bellows will lineally expand by a greater amount. For example, if the bellows 120 has a diameter four times greater than that of the small bellows 122, an amplification having a 16 to 1 ratio is provided. However, coupled with this if the lever 104 has a mechanical amplification of 3 to 1, the total amplification will be 48 to 1 so that only very slight travel in the slip spindel, e.g., 0.005 inch, is required, the first 0.003 inch being used to shift the valve and the last 0.002 inch being used to operate the switch 44.

It will thus be seen that this invention provides in a machine tool feed control means for producing a signal when the tool contacts the workpiece surface and further means responsive to that signal for controlling the feed mechanism in such a manner that the feed will decelerate from a rapid advance speed to a slow cutting speed and further so that measurement of cutting tool penetration will be initiated. The result of this arrangement is that wasted feed time will be eliminated and at the same time, accurate measurement of tool penetration is made possible regardless of the variations in workpiece dimensions.

While preferred forms of the invention are disclosed herein, the scope of the invention is not limited thereto but rather is defined only by the following claims.

It is claimed:

1. In an automatic drill machine having a drill for forming holes of a predetermined depth in a workpiece comprising in combination: hydraulic feed means for moving the drill in an axial direction toward the workpiece including shiftable hydraulic valve means for controlling the rate of drill feed; electrical control means operatively connected with the hydraulic feed means for measuring and limiting the depth of drill penetration into the workpiece; means for producing a signal upon contact of the drill with the workpiece comprising a drill spindle axially slidably mounted within a housing, and means for biasing the spindle toward the workpiece so that when the drill engages the workpiece the spindle will slide relative to the housing in an opposite axial direction away from the workpiece, whereby the sliding movement constitutes the signal; means responsive to the said signal for shifting the hydraulic valve means to reduce the rate of drill feed upon contact of the drill with the workpiece; and means responsive to the said signal and coupled with the control means for starting the measurement of drill depth penetration upon contact of the drill with the workpiece.

2. In a machine having a cutting tool and having both means for measuring the depth of cut in a workpiece and hydraulic feed means for moving the tool in an axial direction toward the workpiece including means for controlling the rate of feed of the tool, means for producing a signal upon contact of the tool with the workpiece including a machine housing and a tool holder assembly slidably mounted within the housing so that the tool holder assembly slides with respect to the housing upon contact of the tool with the workpiece in an opposite axial direction away from the workpiece, the sliding movement constituting the said signal, means responsive to the signal for initiating the measurement of the depth of cut, and a hydraulic valve means in the feed mechanism responsive to said signal for reducing the rate of feed upon contact of the tool with the workpiece.

3. An automatic drill machine as described in claim 1 wherein the means responsive to said signal coupled with the control means comprises a switch connected to the control means and actuated by the motion of the spindle.

4. An automatic drill machine as described in claim 3 wherein the means responsive to the said signal for shifting the hydraulic valve means includes a lever pivotally mounted on the housing, one end of the lever being in engagement with the spindle so that the lever pivots upon axial movement of the spindle, and the other end of the lever being connected to the hydraulic valve means whereby the valve means is shifted upon axial movement of the spindle.

5. An automatic drill machine as described in claim 4 wherein the switch is connected to the spindle by the lever so that the switch is actuated by the movement of the lever.

6. An automatic drill machine as described in claim 4 wherein the said other end of the lever is connected to the hydraulic valve means by a hydraulic amplifying means comprising a large diameter bellows hydraulically connected to a relatively small diameter bellows, each bellows having one end fixed to the housing, the other end of the lever being in contact with the other end of the large diameter bellows to compress that bellows upon movement of the spindle, and the small diameter bellows having its other end connected to the hydraulic valve means.

7. A machine having a cutting tool as described in claim 2 wherein the housing and tool holder assembly each define ports and passageways which together constitute the said hydraulic valve means which valve is actuated by relative movement of the housing and tool holder assembly.

8. A machine having a cutting tool as described in claim 7 wherein the tool is a rotary cutting tool, and the tool holder assembly comprises a spindle rotatably mounted within the housing by a bearing, the bearing having an outer cage slidably mounted within the housing for axial movement upon contact of the cutting tool with the workpiece; the said cage defining a portion of the said ports and passageways thereby comprising one portion of said valve means.

References Cited

UNITED STATES PATENTS

| | | | |
|---|---|---|---|
| 3,336,821 | 8/1967 | Firth | 77—32.7 |
| 3,302,492 | 2/1967 | Weidig | 77—32.1 |
| 2,854,869 | 10/1958 | Hirvonen | 77—32.1 |

FRANCIS S. HUSAR, Primary Examiner

U.S. Cl. X.R.

77—5, 32.7